(12) United States Patent  
Hager et al.

(10) Patent No.: US 6,731,234 B1
(45) Date of Patent: May 4, 2004

(54) RADAR ANTI-FADE SYSTEMS AND METHODS

(75) Inventors: James R. Hager, Golden Valley, MN (US); Lavell Jordan, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/458,943

(22) Filed: Jun. 11, 2003

(51) Int. Cl.[7] ............................................. G01S 13/18
(52) U.S. Cl. ......................... 342/94; 342/120; 342/122
(58) Field of Search ........................ 342/89, 94, 95, 342/120, 121, 122, 159, 160, 161, 162, 195

(56) References Cited

U.S. PATENT DOCUMENTS

| | | | |
|---|---|---|---|
| 4,029,271 A | | 6/1977 | Murphy et al. |
| 4,241,346 A | * | 12/1980 | Watson .......................... 342/74 |
| 4,429,310 A | * | 1/1984 | Zscheile et al. ............ 342/135 |
| 4,568,938 A | * | 2/1986 | Ubriaco ........................ 342/87 |
| 4,584,646 A | | 4/1986 | Chan et al. |
| 4,801,110 A | | 1/1989 | Skutecki |
| 4,959,654 A | * | 9/1990 | Bjorke et al. ................ 342/120 |
| 5,014,063 A | * | 5/1991 | Studenny .................... 342/130 |
| 5,150,125 A | * | 9/1992 | Hager ......................... 342/120 |
| 5,195,039 A | | 3/1993 | Gold et al. |
| 5,592,131 A | * | 1/1997 | Labreche et al. ........... 332/103 |
| 5,719,582 A | * | 2/1998 | Gray .......................... 342/120 |
| 5,805,110 A | * | 9/1998 | McEwan ..................... 342/387 |
| 5,898,401 A | * | 4/1999 | Walls .......................... 342/82 |
| 6,407,697 B1 | * | 6/2002 | Hager et al. ................ 342/120 |
| 6,494,093 B2 | * | 12/2002 | McCall et al. ................ 73/497 |
| 6,522,992 B1 | * | 2/2003 | McCall et al. ............. 702/141 |
| 6,583,733 B2 | | 6/2003 | Ishihara et al. |
| 2002/0036574 A1 | | 3/2002 | Ishihara |
| 2003/0080242 A1 | | 5/2003 | Kawai |

* cited by examiner

Primary Examiner—John B. Sotomayor
(74) Attorney, Agent, or Firm—Matthew Luxton, Esq.; Armstrong Teasdale LLP

(57) ABSTRACT

A method for suppressing ground return radar fading in a radar altimeter is described. The method includes providing a radar gate width which corresponds to an area that is smaller than an antenna illumination area being impinged by transmissions of the radar altimeter, dithering the radar gate viewing area within the antenna illumination area being impinged by transmissions of the radar altimeter, and taking radar return samples with the radar altimeter.

21 Claims, 4 Drawing Sheets

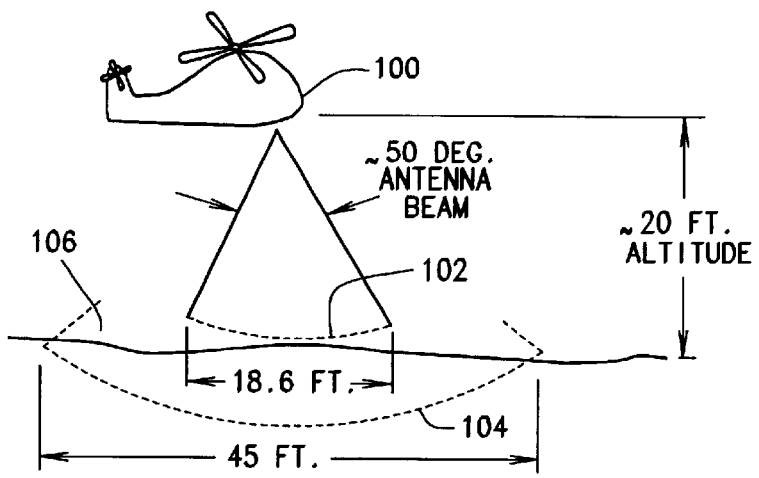
F I G . 3
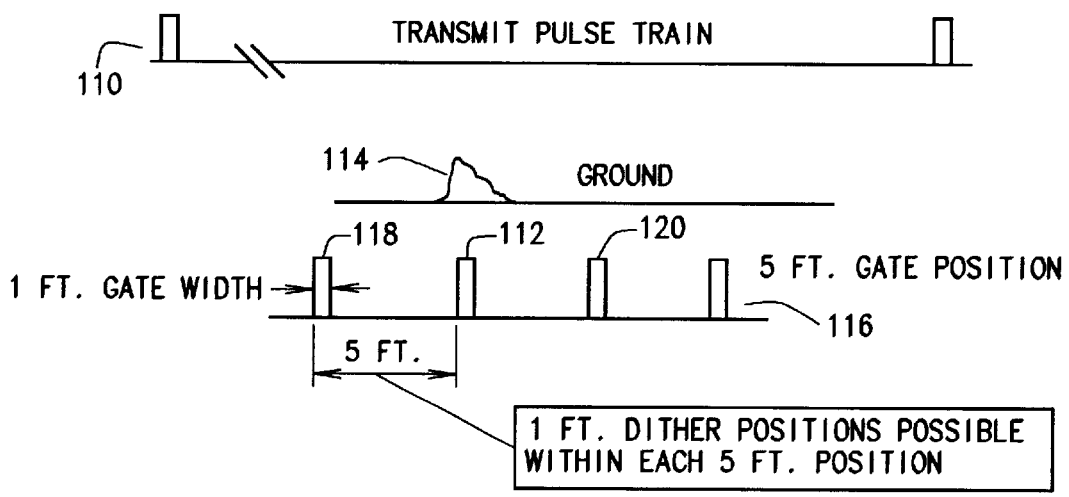
F I G . 4

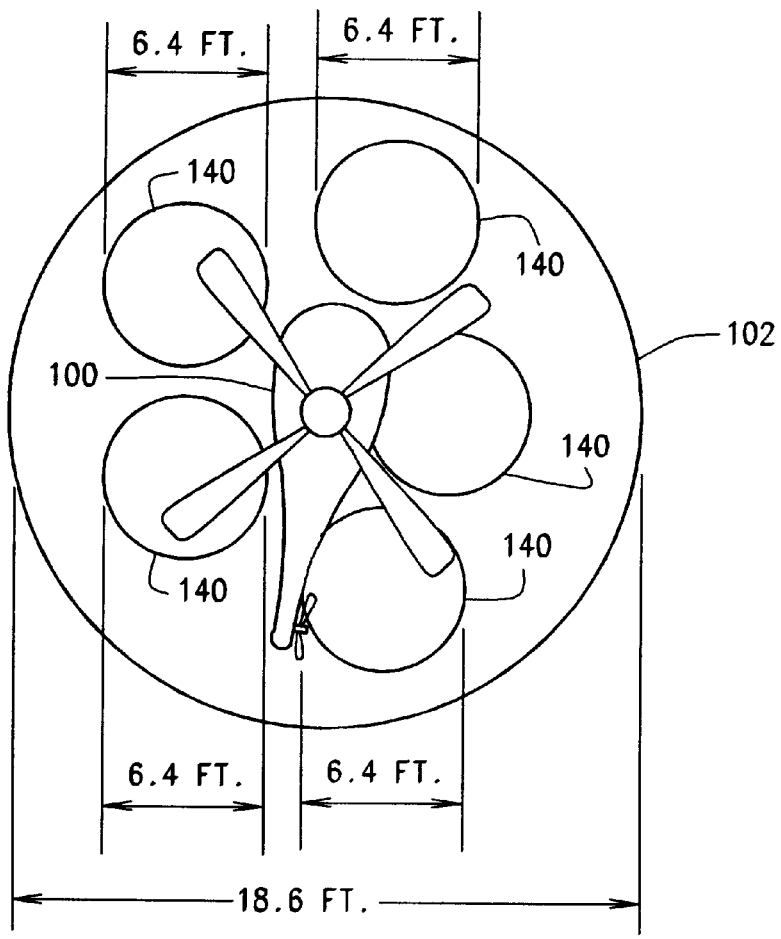
F I G. 5
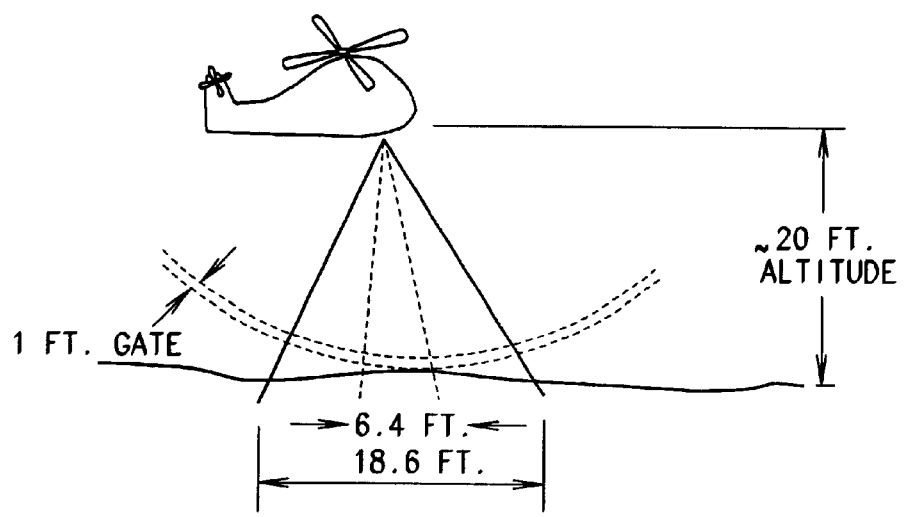
F I G. 6

RADAR ANTI-FADE SYSTEMS AND METHODS

BACKGROUND OF THE INVENTION

This invention relates generally to radar operations, and more specifically to, systems and methods for addressing radar fading problems which can occur during hovering operations.

Flight platforms must be able to hold an altitude during hovering operations. An example of such a flight platform is a helicopter and an example of such an operation is a rescue maneuver. Radar altimeters are commonly implemented within such flight platforms as part of an overall flight control system. Some of these flight platforms utilize the flight control systems to maintain hovering altitudes, and these flight control systems rely on reliable radar altimeter performance during the hover operations.

A radar altimeter typically includes a transmitter for applying pulses of electromagnetic energy at regular intervals to an antenna which then radiates the energy, in the form of a transmit beam, towards the earth's surface. A transmit beam from a radar is sometimes said to "illuminate" an area (e.g. the ground) which reflects (returns) the transmit beam. The reflected beam (ground returns) is received at a receive antenna of the radar altimeter and processed to determine an altitude.

Ground return fading due to phase cancellations in radar return signals is a common occurrence during hovering operations. A ground return fade occurs when a patch of ground reflecting radar transmit pulses actually reflects a multitude of radar returns whose net phase adds to zero, resulting in a total radar return amplitude of zero. When an aircraft is moving horizontally at low altitudes, these ground return fades and opposite amplitude peaks occur rather randomly and quickly such that an integrated or filtered net result typically has no affect on radar altimeter performance.

However, when in a hovering or other holding altitude operation, with little or no horizontal movement, a ground return fade can last indefinitely. At least one result is that the radar altimeter can break track, providing an indeterminate altitude to the flight control system.

BRIEF SUMMARY OF THE INVENTION

In one aspect, a method for suppressing ground return radar fading in a radar altimeter is provided. The method comprises providing a radar gate width which corresponds to an area that is smaller than an antenna illumination area being illuminated by transmissions from the radar altimeter, dithering the radar gate viewing area within the antenna illumination area being illuminated by the transmissions from the radar altimeter, and taking radar return samples with the radar altimeter.

In another aspect, a radar altimeter configured to suppress ground return fading is provided. The radar altimeter comprises a sequencer for modulating a first signal, a transmitter coupled to the sequencer for transmitting a radar signal including the modulated first signal toward the ground, and a receiver for receiving a reflected radar signal from the ground. The received radar signal includes the modulated first signal. The radar altimeter further comprises a sampling clock, a dithering circuit coupled to the sampling clock and a digitizer coupled to the receiver and the sampling clock. The digitizer generates digital samples of the modulated first signal. The sampling clock, the dithering circuit, and the digitizer comprise at least a portion of a radar range gate function providing a radar range gate width which corresponds to a viewing area that is smaller than an antenna illumination area where the transmitter transmits the radar signal and dithering a position of the radar range gate within the illumination area where the transmitter transmits the radar signal.

In still another aspect, a unit for dithering a position of a radar range gate is provided. The unit comprises a sampling clock, a dithering circuit coupled to the sampling clock and an analog-to-digital (A/D) converter coupled to the dithering circuit. The A/D converter takes samples following each transmission of a radar altimeter. The times when the samples are taken being dithered from the sampling clock cycles by the dithering circuit.

In yet another aspect, a method for operating a radar altimeter is provided. The method comprises transmitting a signal towards the ground, receiving a reflection of the transmitted signal within a radar range gate, the radar range gate having a width corresponding to a viewing area on the ground smaller than an area reflecting the transmitted signal, and moving a position of the radar range gate within the area reflecting the transmitted signal. The method further includes repeating the above described steps.

BRIEF DESCRIPTION OF THE DRAWINGS

FIG. 3 is a side view of the illustration of the antenna beam area and radar range gate area of FIG. 2.

FIG. 4 illustrates radar range gate pulses with respect to transmit pulses and ground returns.

FIG. 5 illustrates an antenna beam area with respect to a narrowed radar range gate area.

FIG. 6 is a side view of one narrowed radar range gate area and the antenna beam area of FIG. 5.

DETAILED DESCRIPTION OF THE INVENTION

Figure 1:
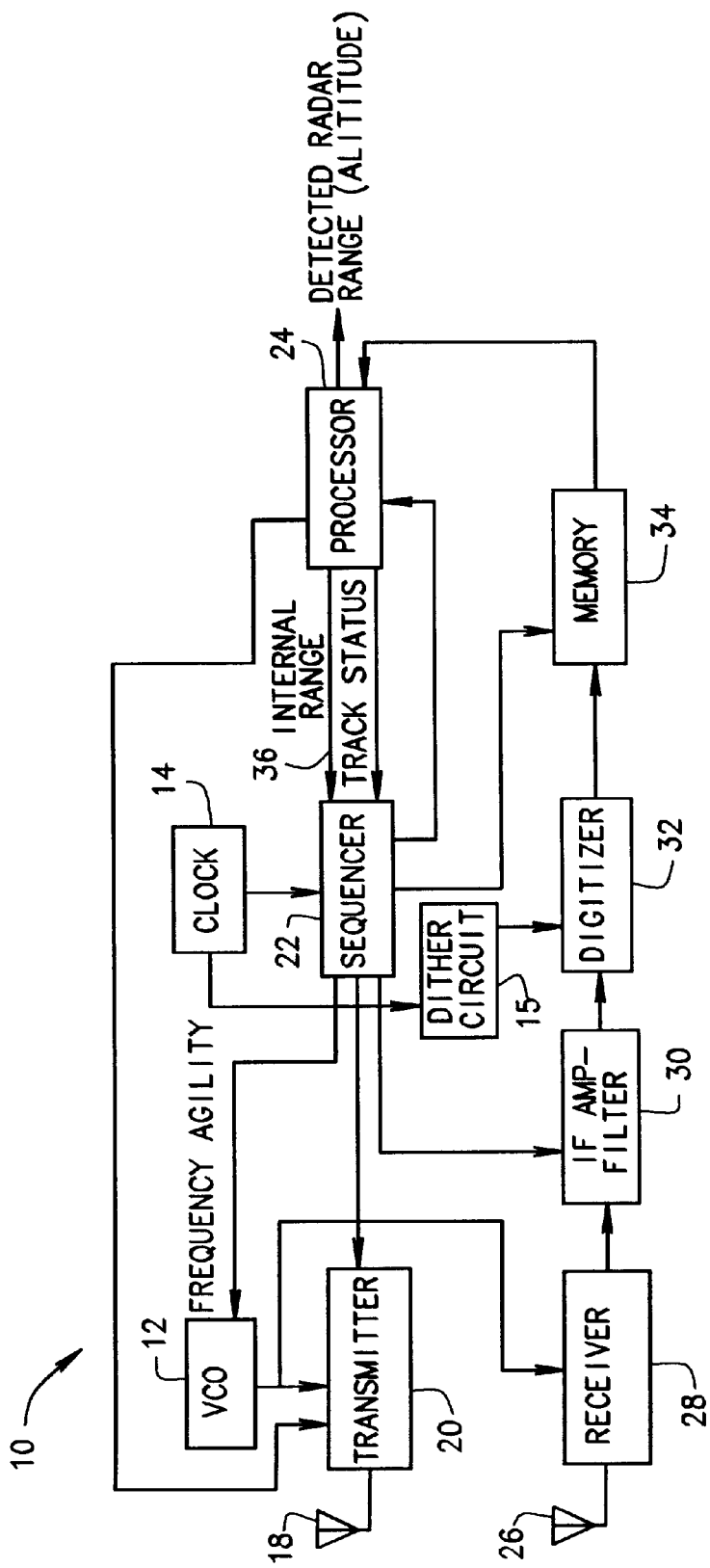
FIG. 1 is a block diagram of a radar altimeter.

FIG. 1 is a block diagram illustrating one embodiment of a radar altimeter 10. In a preferred embodiment, radar altimeter 10 is incorporated in an air vehicle, for example, a helicopter. As described in detail below, radar altimeter 10 incorporates an effective mechanism that allows hovering and holding operations of an air vehicle to be accomplished without the known problems of ground return fading of the radar returns. Radar altimeter 10 includes voltage controlled oscillator (VCO) 12, clock 14, dither circuit 15, transmit antenna 18, transmitter 20, sequencer 22, processor 24, receive antenna 26, receiver 28, intermediate frequency (IF) amplifier-filter 30, digitizer 32, and memory 34.

Transmitter 20 transmits pulses of RF energy through antenna 18. In one embodiment, the RF energy is modulated with a pulse compression Bi-phase coded format produced by sequencer 22. The output power of transmitter 20 is controlled in a closed loop fashion by processor 24. The output power of transmitter 20 is minimized by processor 24 for low probability of detection by undesired radiated signal interceptors.

Antenna 26 receives radar signals reflected from the ground. The received signals are amplified and mixed down to IF by receiver 28, and further amplified and band limited by IF amplifier-filter 30. Digitizer 32 digitizes the received signal from (IF) amplifier-filter 30 and outputs the digitized samples to memory 34.

Sequencer 22 selects ground return samples corresponding to a present altitude delay (as determined by processor 24 and communicated to sequencer 22 on an internal range line 36) and shifts the selected samples from memory 34 to processor 24. Processor 24 then determines if the next set of samples should be taken closer in or further out in range, which corresponds to a delay between transmit pulses and an expected return of the pulses. Processor 24 then generates a new internal range command, which is sometimes referred to as moving a radar range gate. The result is a closed-loop altitude tracking servo, such that as the altitude changes, processor 24 generates a measure of range tracking error which is used to change the internal range command fed back to sequencer 22. Processor 24 generates an output altitude from the determined range.

Radar range is determined by utilizing an amount of time it takes for a radar pulse to travel from a transmit antenna to the ground, to reflect from a target (e.g. the ground) and then return to receive antenna 26 as a radar return signal. A radar range gate, incorporated into digitizer 32, is essentially a switch that only allows selected samples of the return signal to be processed. In some contexts, a "range gate" implies a switch that may be closed for a finite length of time during the gating interval, but in the digital signal processing context, range gates correspond to discrete samples taken within the gating interval. The return signal can not get through the range gate until the point in time at which the switch is closed. For example, if a radar range gate is set to a slant range of 1000 feet, the range gate will wait two microseconds (which is the amount of time corresponding to radar signals traveling a range of about 1000 feet) after transmission, and then close to allow the sampled return signal to pass through. The time the switch is closed is referred to as the gate width. A range processor within processor 24 is responsible for setting the slant range of the range gates in digitizer 32.

Each radar pulse that is transmitted toward the ground returns as a wider signal due to terrain spreading bounded by an antenna illumination area. Digitizer 32 begins sampling and digitizing (effectively performing the gating function) on command from sequencer 22 which time marks the gate position in time (corresponding to radar range) after a radar signal is transmitted. Digitizer 32 then outputs the samples to memory 34, which is accessed by processor 24 to perform the above described radar range gate function. In order to identify the nearest, or generally highest, point on the ground, the closest or earliest sample with energy must be identified.

Digitizer 32 outputs gated samples to memory 34, where the samples are ultimately processed by the range processing function within processor 24. The closed loop range processing function interrogates the samples received from memory 34, and tracks the gate position on leading edge of the return (e.g. the first sample with energy). The sample number or point in time with respect to the time of transmit at which the first sample with energy is obtained is referred to as the slant range to the nearest target for that radar transmission. The range processing function within processor 24 sets the radar range gate function within processor 24 to the appropriate slant range. In a preferred embodiment, the range processing function begins its interrogation of the samples received from digitizer 32, through memory 34, at a point in time corresponding to a historic altitude average, which is determined from previous altitude calculations. The range processing function then moves the range gate inbound or earlier in time until the first sample with non-zero energy is identified.

In one embodiment, dithering circuit 15, radar receiver 28, digitizer 32, memory 34, and processor 24 form a narrow range gate generator within radar altimeter 10. In the embodiment, digitizer 32 is a high-speed A/D converter which takes samples following each radar pulse transmission and at the radar delay time (or radar range) determined by processor 24 and provided to digitizer 32 by sequencer 22. At lower altitudes where ground return fading may occur, sequencer 22 sets a gate width of the range gate generator to a width equal to the width of a single sample, resulting in a two nanosecond (the time it take a radar signal to travel one foot, or one radar foot) wide gate. The very narrow gate is generated by the 100 MHz A/D converter aperture time (the actual time it takes to take a single sample) of about two nanoseconds. At higher altitudes where ground return fading is not likely to occur, the gate width is increased to many of the two nanosecond sample widths (100 MHz aperture time) to increase the duty cycle of radar receiver 28 to provide the increased sensitivity required at the higher altitudes.

Figure 2:
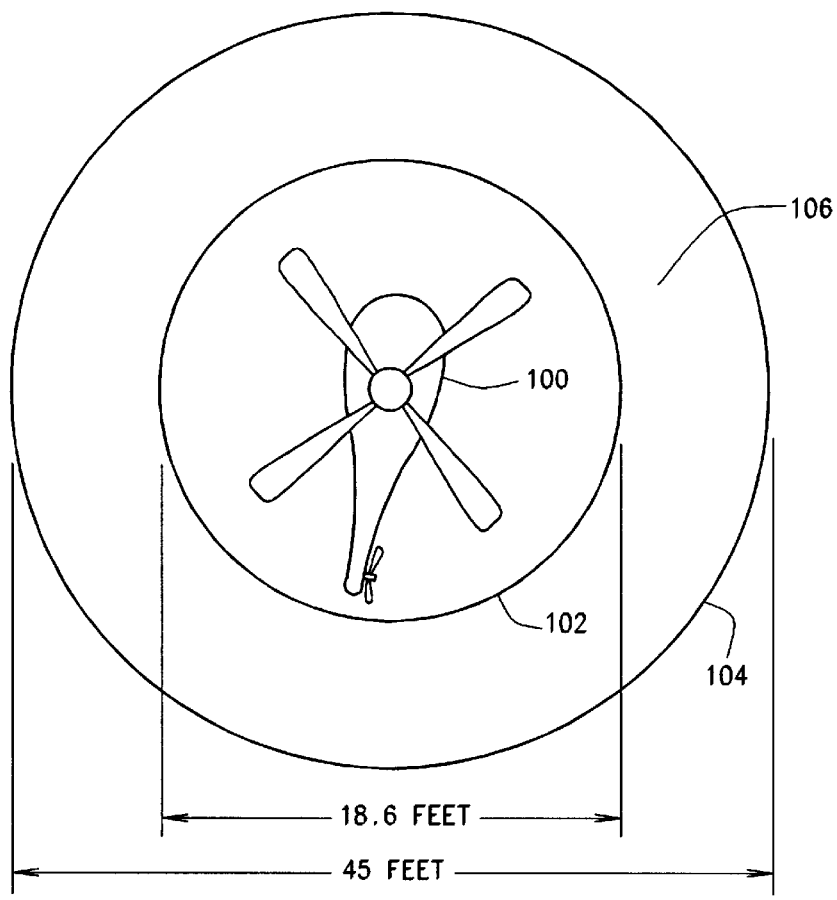
FIG. 2 illustrates an antenna beam area with respect to a radar range gate area for a radar altimeter.

Operation of radar altimeter 10 with respect to transmit pulses and range gating is further described with respect to FIGS. 2 through 7. FIG. 2 illustrates radar altimeter operation, for example, in a low altitude hover as might be experienced by a helicopter 100. At a hovering height of about 20 feet, radar transmit pulses from a typical 50 degree transmit antenna beam result in an approximate 18.6 foot diameter antenna beam illumination area 102 that receives portions of the radar transmit pulses (e.g. the radar transmit beam). However, utilizing a radar altimeter which has a 20 nanosecond range gate width, as is commonly used, results in radar returns being processed from a range gate area 104 which has a viewing area of approximately 45 feet in diameter. That antenna beam illumination area 102 is smaller than range gate viewing area 104 is a cause of ground return fading. This is because although the gated viewing area is larger then the antenna illuminated area, the only energy available during the gate interval is that from the antenna illuminated area. As the gate position is moved, or dithered slightly, in position the same illuminated area is sampled. In other words, nothing has changed and if a fade was present, the fade is still present.

As shown in FIG. 3, diameters of antenna beam illumination area 102 and range gate viewing area 104 represent a radar range gate and a radar antenna beam relationship with a typical minimum range gate width of 20 nanoseconds (10 radar feet wide) and is further based on an altitude of 20 feet, which is a typical altitude in hovering and rescue operations. Under such typical hovering conditions, and as described above, range gate area 104 is about 45 feet in diameter, which is an area illuminated by the intersection of a 20 nanosecond (10 radar feet) wide range gate with terrain at 20 feet altitude. Range gate area 104 is therefore well outside an 18.6 feet diameter antenna beam illumination area 102 which is the area illuminated by a typical 50 degree transmit antenna beam from radar altimeter 10 at 20 feet altitude.

FIGS. 2 and 3 illustrate that at low altitudes, and with minimum range gate widths that are presently incorporated in radar altimeters, a ground return fade cannot be eliminated by moving the radar range gate. The reason is that the narrowest range gate width attainable in known altimeters still have a range gate viewing area 104 that is much larger in diameter than is the area illuminated by antenna beam illumination area 102.

FIG. 4 illustrates a transmit pulses 110 from, for example, radar altimeter 10, and the delays between each transmit pulse 110. A radar range gate is set at a time, illustrated by sample 112, which is about the time that a radar transmit pulse reflection 114 will be received at receive antenna 26 of radar altimeter 10. Known A/D converters that have a dynamic range sufficient for use as digitizers in a radar altimeter run at a maximum clocked sample speed of about 100 MHz. As illustrated in FIG. 4, a 100 MHz sample rate 116 is ten nanoseconds (or 5 radar feet) between samples. The 100 MHz sample rate 116 then results in a five foot gate position resolution. Referring to 100 MHz sampling rate 116, it can be seen that there are times in between the individual samples where other samples could be taken by dithering the times at which samples 118 and 120, which precede and follow sample 112, are taken (gate position). As used herein, the term "dithering" means hopping a position (viewing area) of a range gate around a point in time.

Individual samples in a radar range gate are delayed by a radar altitude delay provided by the radar processing functions described above within processor 24, with the minimum effective range gate width being a sampling aperture time of the A/D-converter (digitizer 32). However, in one embodiment, processor 24 contains functionality to dither a viewing area of a radar range gate position, which is sometimes referred to as a gate patch. In one exemplary embodiment of dithering of the range gate viewing area, the radar range gate viewing area is moved plus or minus the time it takes a radar pulse to travel one foot in between radar transmit pulses to provide a different gate patch for each radar transmission. The dithering therefore provides very rapid range gate movement around the desired position and reduces or eliminates effects of ground return fading since the viewed gate area is different for each new dithered gate position, but still within the antenna illuminated area.

A gate position that is dithered by about one foot, in one embodiment, is provided by dither circuit 15 dithering a sampling clock 14 that is provided to digitizer 32 (all shown in FIG. 1). In the embodiment, dither circuit 15 is a programmable delay line, or in an alternative embodiment, dither circuit 15 includes multiple, selectable delay paths. It is anticipated that A/D converters with the dynamic range required of a radar altimeter will operate at sample frequencies of 500 MHz will become available, which will be capable of providing a two nanosecond (one radar foot) sampling interval. When utilizing such A/D converters, dither circuit 15 becomes unnecessary, as the dithering function can be provided by processor 24. The process for dithering a radar range gate position is described further with respect to FIGS. 5, 6, and 7.

FIGS. 5 and 6 illustrate a result which occurs when a radar range gate that is very narrow and capable of being dithered is incorporated into radar altimeter 10 as described with respect to FIG. 1. As shown, helicopter 100 provides an antenna beam illumination area 102 of about 18.6 feet as described above. However, by incorporating a very narrow radar range gate width of about two nanoseconds (one radar foot), a 6.4 foot diameter range gate viewing area 140 is provided. Range gate viewing area 140 is well within the 18.6 foot antenna patch 102. As range gate viewing area 140 is considerably smaller, there is considerable space to move the range gate viewing area 140 to multiple locations within the antenna beam which generates antenna beam illumination area 102, through implementation of dither circuit 15, as is shown. While five distinct range gate viewing areas 140 are shown in FIG. 5, it is to be understood that to counteract the ground fading problem, range gate viewing areas 140 only need to be moved slightly from sample to sample, and can in fact partially overlap an area of the previous sample. In addition, less than, or many more than five range gate viewing areas 140 can be obtained within antenna beam illumination area 102.

The above described solution to radar ground return fading is a system and corresponding method of generating a range gate of sufficiently narrow measure resulting in a range gate viewing area 140 considerably smaller than antenna beam illumination area 102. By rapidly moving this range gate viewing area 140 within antenna beam illumination area 102 when a fade begins to occur, a slightly different illumination patch (range gate viewing area 140) occurs and produces a different phase relationship to a previous ground return, resulting in little or no ground return fade.

The implementation of a narrow range gate generator and dither circuit 15 (shown in FIG. 1) within radar altimeter 10 provides a simple, yet effective solution to the ground return fading problems which typically occur during hovering. In one embodiment, a high-speed analog-to-digital (A/D) converter within digitizer 32 (shown in FIG. 1) takes a single sample of range gate viewing area 140 following each radar pulse transmission. The taking of the sample is delayed by a radar altitude delay that is provided through known radar tracking functions within processor 24. The effective radar range gate width is therefore the sampling aperture time of the A/D converter. Aperture times for high speed A/D converters is less than two nanoseconds or a radar gate width of about one foot. Processor 24 further includes functionality to dither the radar range gate viewing area. By dithering the gate viewing area (dithering the sampling clock into a sampling clock input of an A/D converter), radar returns are sampled at different positions within antenna beam illumination area 102, eliminating the effects of ground return fading.

Figure 7:
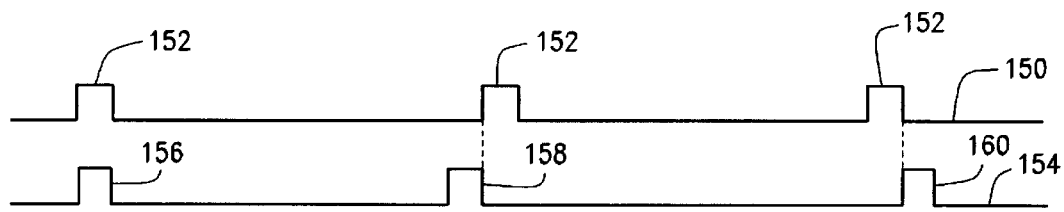
FIG. 7 illustrates dithering of radar range gate pulses.

FIG. 7 further illustrates dithering of a gate position. Waveform 150 illustrates a radar range gate for a radar altimeter which utilizes a high speed A/D converter which does not incorporate dithering of the range gate. Pulses 152 are about two nanoseconds in width and are evenly spaced in occurrence, for example, pulses 152 occur every 100 microseconds. Waveform 154 also illustrates a range gate for radar altimeter 10 which utilizes a high speed A/D converter, and implements dithering of the range gate as above described. While pulse 156 is two nanoseconds in duration, it also aligns, in time with pulse 152. However, pulse 158 is dithered by about two nanoseconds in radar altimeter 10, therefore pulse 158 occurs about two nanoseconds before the second pulse 152. Pulse 160 has been dithered by about four nanoseconds from pulse 158. Therefore pulse 160 occurs about two nanoseconds after the corresponding third pulse 152. By dithering radar gate pulses in a similar fashion to the dithering illustrated with respect to pulses 158 and 160, a different viewing area within the antenna illumination area reflecting the radar transmit pulses is sampled, and ground return fading is significantly reduced or eliminated.

By incorporating the methods and apparatus described above into radar altimeters, the known problems of ground return fading which are typically experienced during hovering and other like maneuvers can be overcome. The above described improvements therefore add to the safety features that are provided by existing radar altimeters.

While the invention has been described in terms of various specific embodiments, those skilled in the art will recognize that the invention can be practiced with modification within the spirit and scope of the claims.

What is claimed is:

1. A method for suppressing ground return radar fading in a radar altimeter, said method comprising:

providing a radar range gate width which corresponds to a viewing area that is smaller than an antenna illumination area being impinged by transmissions of the radar altimeter;

dithering the radar gate viewing area within the antenna illumination area being impinged by transmissions of the radar altimeter; and taking radar return samples with the radar altimeter.

2. A method according to claim 1 wherein providing a radar range gate width comprises providing a range gate width of about two nanoseconds.

3. A method according to claim 1 wherein taking radar return samples comprises taking samples following each radar transmission with an analog-to-digital converter, the samples following-the radar transmission by an altitude delay.

4. A method according to claim 3 wherein providing a radar range gate width comprises setting the radar range gate width to a time approximately equal to a single sampling time of the analog-to-digital converter.

5. A method according to claim 3 wherein dithering the radar range gate position comprises dithering a sampling clock provided to the analog-to-digital converter.

6. A method according to claim 5 wherein dithering a sampling clock comprises implementing at least one of a programmable delay line and multiple delay paths between a sampling clock and a sampling clock input to the A/D converter.

7. A method according to claim 1 wherein dithering the radar range gate position comprises moving the radar range gate position plus or minus the time it takes a radar pulse to travel about one foot in between radar transmit pulses.

8. A radar altimeter comprising:

a sequencer for modulating a first signal;

a transmitter coupled to said sequencer for transmitting a radar signal including the modulated first signal toward the ground;

a receiver for receiving a reflected radar signal from the ground, the received radar signal including the modulated first signal;

a sampling clock;

a dithering circuit coupled to said sampling clock; and a digitizer coupled to said receiver and to said dithering circuit, said digitizer generating digital samples of the modulated first signal, said sampling clock, said dithering circuit, and said digitizer comprising at least a portion of a radar range gate function providing a radar range gate width which corresponds to a viewing area that is smaller than an antenna illumination area where said transmitter transmits the radar signal and dithering a position of the radar range gate within the antenna illumination area where said transmitter transmits the radar signal.

9. A radar altimeter according to claim 8 wherein said digitizer comprises an analog-to-digital (A/D) converter, said A/D converter comprising an aperture time of about two nanoseconds.

10. A radar altimeter according to claim 8 wherein said digitizer comprises an analog-to-digital (A/D) converter taking samples following each radar transmission, the samples following the radar transmission by an altitude delay.

11. A radar altimeter according to claim 10 further comprising a processor, said processor providing the radar range gate width to said digitizer, the radar range gate width being set to time approximately equal to a single sampling time of said analog-to-digital converter.

12. A radar altimeter according to claim 8 wherein to dither a position of the radar range gate, said dithering circuit is configured to dither a sampling clock signal from said sampling clock, the dithered sampling clock signal being provided to said digitizer.

13. A radar altimeter according to claim 12 wherein said dithering circuit comprises at least one of a programmable delay line and multiple, selectable delay paths between said sampling clock and said digitizer.

14. A radar altimeter according to claim 8 further comprising a processor, wherein to dither the position of the radar gate position, said processor causes said dithering circuit to delay or accelerate a sampling of the modulated first signal such that the radar gate position is moved plus or minus the time it takes a radar pulse to travel about one foot in between radar transmissions.

15. A unit for dithering a position of a radar range gate comprising, a sampling clock;

a dithering circuit coupled to said sampling clock;

an analog-to-digital (A/D) converter coupled to said dithering circuit, said A/D converter taking samples following each transmission of a radar altimeter, the times when samples are taken being dithered from the sampling clock cycles by said dithering circuit.

16. A unit according to claim 15 wherein said dithering circuit comprises at least one of a programmable delay line and multiple, selectable delay paths between said sampling clock and said digitizer.

17. A unit according to claim 15, said unit coupled to a radar altimeter, wherein the dithered samples taken by said A/D converter comprise a radar range gate width for the radar altimeter.

18. A method for operating a radar altimeter comprising:

(a) transmitting a signal towards the ground;

(b) receiving a reflection of the transmitted signal within a radar range gate, the radar range gate having a width corresponding to a viewing area on the ground smaller than an area reflecting the transmitted signal;

(c) moving a position of the radar range gate within the area reflecting the transmitted signal; and (d) repeating steps (a), (b), and (c).

19. A method according to claim 18 wherein the measured unit is about one foot.

20. A method according to claim 18 wherein receiving a reflection comprises sampling the reflection utilizing an analog-to-digital converter having a sampling aperture time equal to the range gate width.

21. A method according to claim 20 wherein moving a position of the radar range gate comprises dithering times when samples are taken by the A/D converter.

* * * * *

UNITED STATES PATENT AND TRADEMARK OFFICE
CERTIFICATE OF CORRECTION

PATENT NO. : 6,731,234 B1
DATED : May 4, 2004
INVENTOR(S) : Hager et al.

It is certified that error appears in the above-identified patent and that said Letters Patent is hereby corrected as shown below:

Column 2,
Line 12, after "The" delete "AID" and insert -- A/D --.

Signed and Sealed this

Seventh Day of March, 2006

JON W. DUDAS
*Director of the United States Patent and Trademark Office*